United States Patent
Maruyama et al.

(10) Patent No.: US 7,724,316 B2
(45) Date of Patent: May 25, 2010

(54) BACKLIGHT DEVICE AND DISPLAY APPARATUS

(75) Inventors: Naoki Maruyama, Kanagawa (JP); Hirokazu Shibata, Tokyo (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 11/903,124

(22) Filed: Sep. 20, 2007

(65) Prior Publication Data

US 2008/0225197 A1 Sep. 18, 2008

(30) Foreign Application Priority Data

Sep. 22, 2006 (JP) .............................. 2006-257952

(51) Int. Cl.
G02F 1/1333 (2006.01)
(52) U.S. Cl. ........................................................ 349/58
(58) Field of Classification Search .................. 349/58, 349/65, 60
See application file for complete search history.

(56) References Cited

U.S. PATENT DOCUMENTS

| | | | |
|---|---|---|---|
| 5,475,512 A | 12/1995 | Nakazawa et al. | |
| 6,055,033 A | 4/2000 | Yamaguchi et al. | |
| 6,580,476 B2 * | 6/2003 | Hasegawa | 349/58 |
| 6,633,301 B1 | 10/2003 | Dallas et al. | |
| 6,636,282 B2 * | 10/2003 | Ogawa et al. | 349/58 |
| 6,697,134 B2 | 2/2004 | Watanabe et al. | |
| 6,799,865 B2 | 10/2004 | Ellens et al. | |
| 6,817,735 B2 | 11/2004 | Shimizu et al. | |
| 7,184,110 B2 * | 2/2007 | Kim et al. | 349/58 |
| 7,201,493 B2 | 4/2007 | Martynov et al. | |
| 7,213,960 B2 | 5/2007 | Yoo | |
| 7,281,816 B2 | 10/2007 | Suzuki | |
| 7,295,260 B2 * | 11/2007 | Harayama et al. | 349/61 |
| 7,324,080 B1 | 1/2008 | Hu et al. | |
| 7,474,366 B2 | 1/2009 | Haga et al. | |
| 2001/0035853 A1 | 11/2001 | Hoelen et al. | |
| 2003/0063062 A1 | 4/2003 | Tsumura et al. | |
| 2005/0184952 A1 | 8/2005 | Konno et al. | |
| 2005/0219443 A1 | 10/2005 | Tanaka et al. | |

(Continued)

FOREIGN PATENT DOCUMENTS

DE 102004023186 A1 12/2005

(Continued)

OTHER PUBLICATIONS

Moriya, N. et al., "New Color Filter for Light-Emitting Diode Back Light", Japanese Journal of Applied Physics, Apr. 1, 2003, p. 1637-1641, vol. 42 No. 4A, Japan Society of Applied Physics, Tokyo, Japan.

*Primary Examiner*—Tina M Wong
*Assistant Examiner*—Eric Wong
(74) *Attorney, Agent, or Firm*—Wolf, Greenfield & Sacks, P.C.

(57) ABSTRACT

A backlight device includes a light source; supporting means having four edges arranged in a frame-like manner; at least one optical sheet supported by the supporting means and allowing light emitted from the light source to pass therethrough and be incident on a back surface of a liquid crystal panel, the optical sheet having an opening in a position substantially dividing a length of a bottom edge thereof into halves; and a vibration-proof member extending through the opening and fixed to the supporting means.

20 Claims, 6 Drawing Sheets

U.S. PATENT DOCUMENTS

| | | |
|---|---|---|
| 2006/0007111 A1 | 1/2006 | Moon et al. |
| 2006/0007367 A1* | 1/2006 | Cho .......................... 349/58 |
| 2006/0152468 A1 | 7/2006 | Ozaki |
| 2006/0164580 A1 | 7/2006 | Ueda et al. |
| 2007/0297172 A1 | 12/2007 | Furukawa |
| 2008/0036943 A1 | 2/2008 | Matsumoto et al. |
| 2008/0100551 A1 | 5/2008 | Haga et al. |
| 2008/0111960 A1 | 5/2008 | Yoshida et al. |
| 2008/0129680 A1 | 6/2008 | Kimura et al. |
| 2008/0174544 A1 | 7/2008 | Ueda et al. |
| 2008/0186433 A1 | 8/2008 | Haga et al. |

FOREIGN PATENT DOCUMENTS

| | | |
|---|---|---|
| EP | 1672706 A | 6/2006 |
| EP | 1863009 A | 12/2007 |
| JP | 07-325214 A | 12/1995 |
| JP | 10-260402 A | 9/1998 |
| JP | 11-183891 A | 7/1999 |
| JP | 2001-135118 A | 5/2001 |
| JP | 2001-272938 A | 10/2001 |
| JP | 2002-099250 A | 4/2002 |
| JP | 2003-131229 A | 5/2003 |
| JP | 2003-207770 A | 7/2003 |
| JP | 2003-228067 A | 8/2003 |
| JP | 2003-233062 A | 8/2003 |
| JP | 2003-532153 A | 10/2003 |
| JP | 2003-331608 A | 11/2003 |
| JP | 2004-118133 A | 4/2004 |
| JP | 2004-212503 A | 7/2004 |
| JP | 2004-246117 A | 9/2004 |
| JP | 2005-091526 A | 4/2005 |
| JP | 2005-100932 A | 4/2005 |
| JP | 2005-234134 A | 9/2005 |
| JP | 2005-242270 | 9/2005 |
| JP | 3766042 B2 | 2/2006 |
| JP | 2006-058484 | 3/2006 |
| JP | 2008-051905 A | 3/2008 |
| JP | 2008-052131 A | 3/2008 |
| JP | 2008-116914 A | 5/2008 |
| JP | 2008-122713 A | 5/2008 |
| WO | WO 01/84227 A1 | 11/2001 |
| WO | WO 2006/006537 A1 | 1/2006 |
| WO | WO 2007/141732 A | 12/2007 |

* cited by examiner

PRIOR ART

BACKLIGHT DEVICE AND DISPLAY APPARATUS

CROSS REFERENCES TO RELATED APPLICATIONS

The present invention contains subject matter related to Japanese Patent Application JP 2006-257952 filed in the Japanese Patent Office on Sep. 22, 2006, the entire contents of which are incorporated herein by reference.

BACKGROUND OF THE INVENTION

1. Field of the Invention

The present invention relates to a backlight device having one or more optical sheets and a display apparatus such as a liquid crystal display apparatus.

2. Description of the Related Art

Liquid crystal display apparatuses can be configured to have a larger display screen, lighter weight, a shape with a lower profile, lower electricity consumption, etc., than cathode-ray-tube (CRT) display apparatuses. Therefore, they are now used as television receivers or various displays along with, for example, self-luminous plasma display panels (PDPs) and the like.

Typically, a liquid crystal display apparatus has two transparent substrates, which can be of any size, with liquid crystal enclosed therebetween. By applying a voltage, the orientation of liquid crystal molecules is changed to cause light transmittance to change, whereby predetermined images and the like are optically displayed. Because liquid crystal itself does not emit light, a liquid crystal display apparatus has, for example, a backlight device functioning as a light source on the back of a liquid crystal panel. Such backlight device has, for example, a primary light source, a light-guiding plate, a reflective film, a lens sheet, and a diffusing film, and supplies display light over the entire surface of the liquid crystal panel. In such backlight devices, a cold-cathode fluorescent lamp (CCFL) has been used as the primary light source, in which mercury or xenon is enclosed in a fluorescent tube. CCFLs have, however, problems in that they have a low light-emitting luminance, a short life, and a poor uniformity of illuminance due to existence of a low luminance region on the cathode side.

Recently, a light-emitting diode (hereinafter referred to as an LED) backlight device has been attracting attention as an alternative to CCFLs. In such an LED backlight device, a number of red, green, and blue LEDs, which represent the three primary colors of light, are aligned two-dimensionally behind the back surface of the diffusing film to produce white light. The LED backlight device has a low power consumption and enables high-luminance display with a large liquid crystal panel.

Backlight devices have a variety of optical components disposed between the light source unit and the transmissive liquid crystal panel in order to uniformize luminance, chromaticity, and the like over the entire surface of the display. These optical components convert the characteristics of display light emitted from a light source and make the display light uniform. Examples of such optical components include an optical functional sheet block, a light-diffusing/guiding plate, a light-diffusing plate, and a reflective sheet.

As disclosed in, for example, Japanese Unexamined Patent Application Publication Nos. 2006-58484 and 2005-242270, thinner examples of these optical components are typically held in a hanging state, in which a supporting member penetrates through an opening provided in the component to fix the position of the component or so that the component does not become detached from a predetermined attachment position by vibration.

SUMMARY OF THE INVENTION

If the size of a liquid crystal panel of a liquid crystal display apparatus becomes larger, components used therefor also become larger, that is, an optical sheet used in the panel also becomes larger. In the structure in which an optical sheet is hung as described in Japanese Unexamined Patent Application Publication Nos. 2006-58484 and 2005-242270, however, the strength of the optical sheet may be insufficient and the optical sheet may become deformed or damaged.

It is possible to make an optical sheet stand upright by using a structure in which four edges (top, bottom, left, and right) of the optical sheet are held in place. FIG. 10 illustrates a related art method for fixing an optical sheet. In the example shown in FIG. 10, top, bottom, left, and right side edges (four edges) of an optical sheet 102 used in a liquid crystal display apparatus are fixed in place by a frame 101 that constitutes a casing of the liquid crystal display apparatus. However, the optical sheet 102 may become deformed by thermal expansion due to a temperature change or the like. For example, in a state in which a backlight device is positioned so as to stand upright, because the bottom edge of the optical sheet 102 is in contact with an inner peripheral wall of the frame 101, the optical sheet 102 expands upwards and horizontally when undergoing thermal expansion. Therefore, if the four edges of the optical sheet 102 are fixed in place without clearance, creases may be produced therein, resulting in degradation in quality of a picture displayed on the screen of the liquid crystal display apparatus.

Taking thermal expansion into consideration, the frame 101 may be formed to have a size such that the optical sheet 102 does not become detached from the frame 101 so as to cope with the deformation of the optical sheet 102 due to thermal expansion or the like. In this structure, however, the optical sheets, if there is more than one, may rub against each other and may cause scratches when the liquid crystal display apparatus is subjected to vibrations. Accordingly, it is preferable that the optical sheet be installed so as not to become deformed or damaged, and so as not to be dislocated considerably when it is subjected to vibrations.

The present invention has been made in view of the above, and it is desirable that an optical sheet used in a backlight device and the like of a liquid crystal display apparatus be prevented from becoming deformed or damaged under normal usage, and prevented from becoming dislocated considerably when it is subjected to vibrations.

According to an embodiment of the present invention, a backlight device includes a light source; supporting means having four edges arranged in a frame-like manner; at least one optical sheet supported by the supporting means and allowing light emitted from the light source to pass therethrough and be incident on a back surface of a liquid crystal panel, the optical sheet having an opening in a position substantially dividing a length of a bottom edge thereof into halves; and a vibration-proof member extending through the opening and fixed to the supporting means.

According to the above structure, because the optical sheet is positioned to stand upright in a manner such that each edge thereof is held by the supporting means, no force is applied to the opening provided in the optical sheet under normal usage. When the optical sheet is subjected to vibrations, large shifts in the position thereof are suppressed by the vibration-proof member extending through the opening.

According to an embodiment of the present invention, a display apparatus includes a display panel; at least one optical sheet, the optical sheet having an opening in a position substantially dividing a length of a bottom edge thereof into halves; frame-like supporting means for supporting four edges of the optical sheet; and a vibration-proof member extending through the opening and fixed to the supporting means.

According to the above structure, because the optical sheet is positioned to stand upright in a manner such that each edge thereof is held by the supporting means, no force is applied to the opening provided in the optical sheet under normal usage. When the optical sheet is subjected to vibrations, large shifts in the position thereof are suppressed by the vibration-proof member extending through the opening.

According to an embodiment of the present invention, an optical sheet used in a backlight device can be prevented from becoming deformed or damaged under normal usage. Further, because the optical sheet is provided so as not to be dislocated considerably when it is subjected to vibrations, the optical sheets, if there is more than one, do not rub against each other, whereby no scratches are caused.

DESCRIPTION OF THE PREFERRED EMBODIMENTS

An embodiment according to the present invention will now be described with reference to the attached drawings. The example describes the case where the present invention is applied to a transmissive liquid crystal display apparatus having a backlight device. The display apparatus has, for example, a large display screen whose size is greater than 40 inches.

Figure 1:
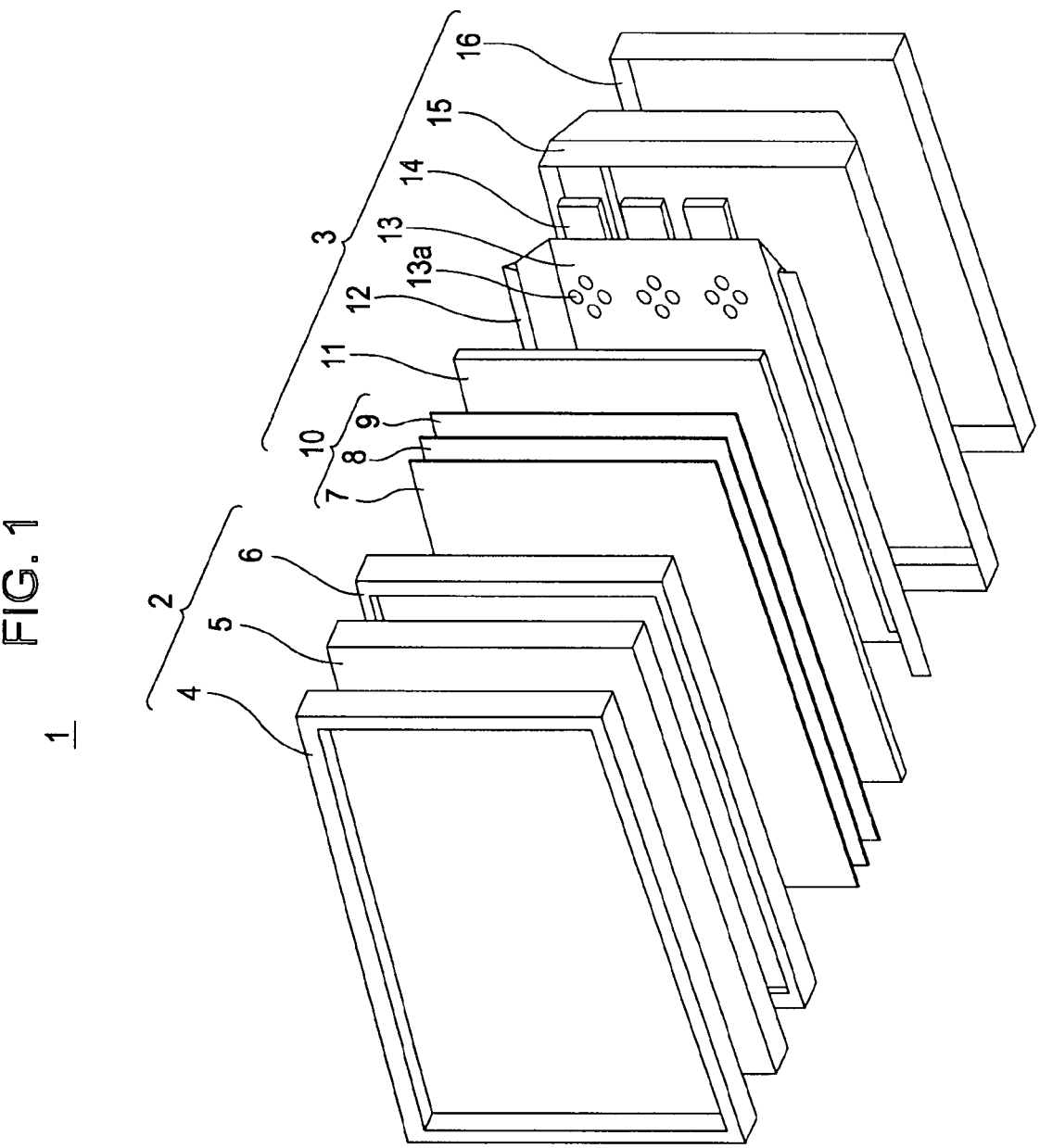
FIG. 1 is an exploded perspective view of a liquid crystal display apparatus according to an embodiment of the present invention.
Figure 2:
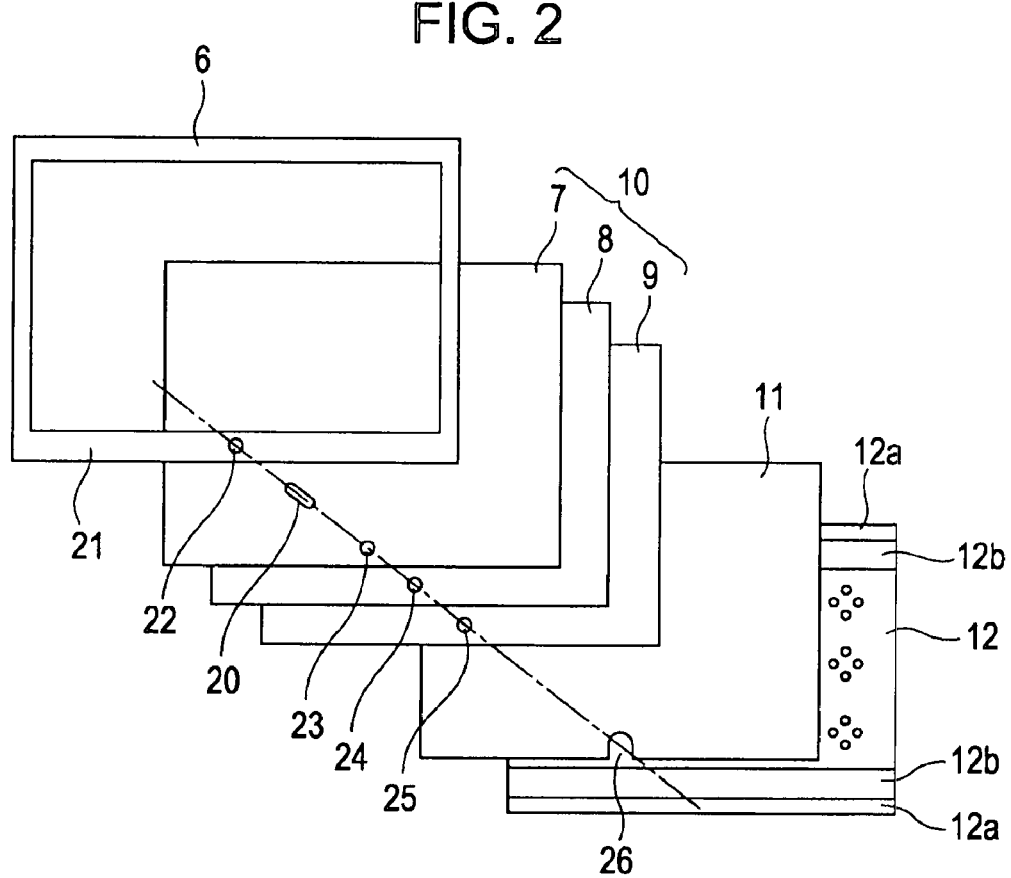
FIG. 2 illustrates a method for fixing an optical-sheet group in place.
Figure 3:
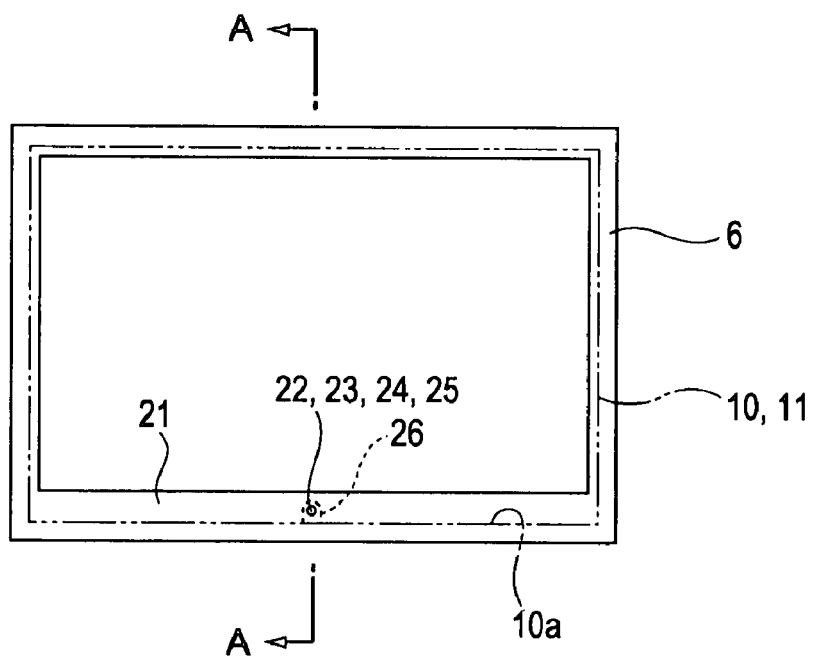
FIG. 3 is a front view of a middle chassis according to the embodiment of the present invention.
Figure 4:
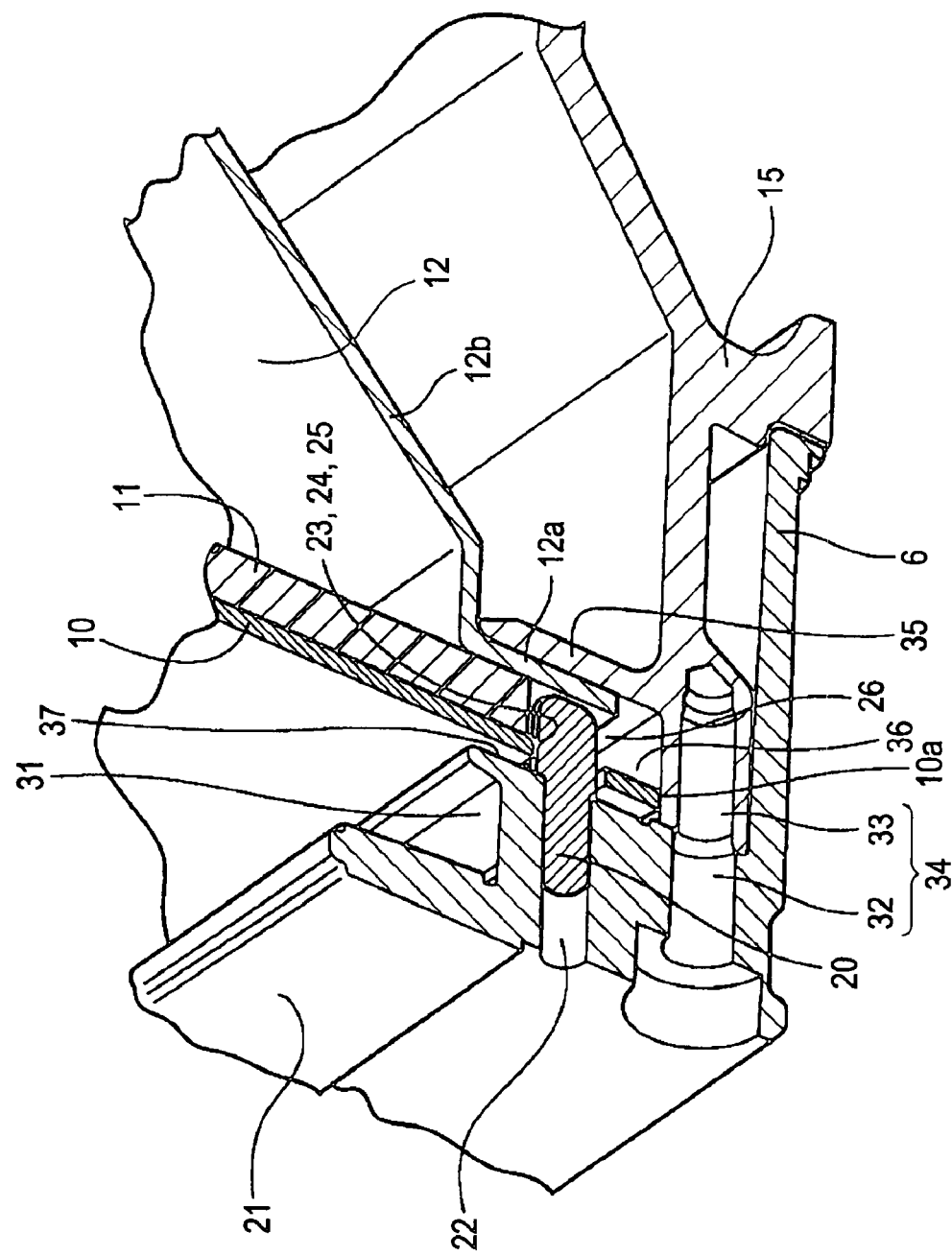
FIG. 4 is an enlarged cross-sectional perspective view of a relevant part, taken along line A-A in FIG. 3.
Figure 5:
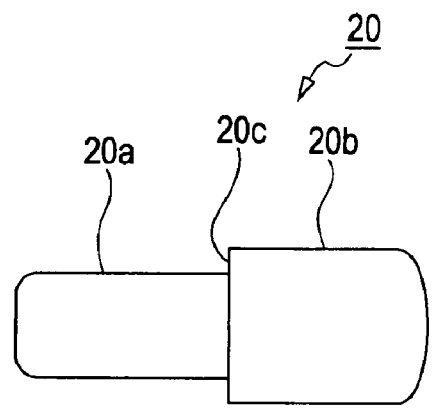
FIG. 5 illustrates a vibration-proof pin according to the embodiment of the present invention.

FIG. 1 is an exploded perspective view of a liquid crystal display apparatus according to an embodiment of the present invention. FIG. 2 illustrates a method for fixing an optical sheet group in place. FIG. 3 is a front view of a middle chassis of the liquid crystal display apparatus. FIG. 4 is an enlarged cross-sectional perspective view taken along line A-A in FIG. 3. FIG. 5 illustrates a vibration-proof pin.

Referring to FIG. 1, a liquid crystal display apparatus 1 as an example of a display apparatus has a liquid crystal panel unit 2 and a backlight device (backlight unit) 3 assembled behind a back surface of the liquid crystal panel unit 2 and irradiates display light.

The liquid crystal panel unit 2 includes a front frame 4, a liquid crystal panel 5, and a frame-like middle chassis 6 functioning as supporting means for an optical sheet. In the liquid crystal panel unit 2, the outer periphery of the liquid crystal panel 5 is placed in a groove 31 (refer to FIG. 4) provided at a bottom edge portion 21 of the middle chassis 6. In this state, the liquid crystal panel 5 is held by being sandwiched between the front frame 4 and the middle chassis 6 with a spacer, guiding components, or the like (not shown) arranged therebetween.

Although detailed description will not be made here, the liquid crystal panel 5 has a first glass substrate and a second glass substrate, which maintain a space therebetween by employing spacer beads or the like, with liquid crystal enclosed therebetween. When a voltage is applied to the liquid crystal, the orientation of the liquid crystal molecules is changed to cause light transmittance to change. The liquid crystal panel 5 has strip-shaped transparent electrodes, an insulating film, and an orientation film on the inner surface of the first glass substrate. Further, the liquid crystal panel 5 has a color filter having the three primary colors, an overcoat layer, strip-shaped transparent electrodes, and an orientation film on the inner surface of the second glass substrate. The liquid crystal panel 5 further has a polarizing film and a retardation film bonded to the outer surface of each of the first glass substrate and the second glass substrate.

In the liquid crystal panel 5, the orientation films made of polyimide align liquid crystal molecules horizontally with respect to the interfaces between the liquid crystal and the substrates. The polarizing film and the retardation film convert wavelength characteristics of light into those of achromatic white light. The received image or the like is displayed in full color by causing light to pass through the color filter. Needless to say, the liquid crystal panel 5 does not necessarily have this structure, but may have a variety of structures commonly available.

The backlight device 3 has a light-emitting unit for supplying display light, disposed behind the back surface of the liquid crystal panel unit 2 and including a plurality of light source substrates 14, a radiating unit (not shown) for radiating heat generated in the light-emitting unit, and a back chassis 16 for holding the light-emitting unit and the radiating unit. The back chassis 16, being assembled with the middle chassis 6 and the side frame 15, constitutes supporting means for supporting a casing. The backlight device 3 has dimensions conforming to the dimensions of the entirety of the back surface of the liquid crystal panel unit 2, and is assembled with the liquid crystal panel unit 2, with a space therebetween optically sealed.

The light source substrates 14 include rectangular wiring substrates, on which red, green, and blue LEDs (hereinafter generically referred to as LEDs) are mounted in a certain alignment according to a predetermined order. The LEDs of the three primary colors constitute light-emitting blocks. A fundamental unit of the light-emitting blocks includes, for example, one red LED, two green LEDs, and one blue LED.

A substantially box-shaped reflective sheet 12 having a bottom portion 13 is installed in front of the light source substrates 14. The bottom portion 13 of the reflective sheet 12 has holes 13a in positions corresponding to the LEDs mounted on the surfaces of the light source substrates 14, and the LEDs of red, green, and blue are inserted through the corresponding holes 13a. Thus, the LEDs are installed in such a manner that they are enclosed within the space defined by a diffusing member 11 and the reflective sheet 12. Among light emitted from the LEDs, the light emitted towards the bottom portion 13 of the reflective sheet 12 is reflected at the surface of the bottom portion 13 and then emitted towards the liquid crystal panel 5.

The reflective sheet 12 has oblique portions 12b and 12b provided at a predetermined angle with respect to the bottom portion 13 (refer to FIGS. 2 and 4) and provided between the bottom portion 13 and top and bottom edge portions 12a and 12a of the reflective sheet 12. For example, an angle from 0 to 90 degrees at which the best luminance distribution on the illuminated surface is obtained is selected as the predetermined angle. The reflective sheet 12 is formed of, for example, an expandable polyethylene terephthalate (PET) material containing a fluorescence agent. The expandable PET material has a high reflectance of about 95% and a tone that is different from a glossy color of a metal, whereby scratches in the reflective surface are unnoticeable. The reflective sheet 12 may also be formed of, for example, mirror-finished silver, aluminum, stainless steel, or the like.

In front of the reflective sheet 12 are installed the diffusing member 11 for diffusing light emitted from the LEDs, and an optical-sheet group 10 including optical sheets 7, 8, and 9. The diffusing member 11 is disposed so as to be stacked on the optical-sheet group 10, on the side opposite to the side facing the liquid crystal panel 5, with the bottom edges of the diffusing member 11 and the optical-sheet group 10 being aligned with each other. The diffusing member 11 is made of a plate body having a certain thickness that is formed of a transparent synthetic resin having a light-guiding property, for example, acrylic resin or polycarbonate resin.

The optical-sheet group 10 is constructed by stacking a plurality of optical sheets having various optical functions. Examples of the optical sheets include a functional sheet for decomposing display light that is supplied from the LEDs mounted on the light source substrates 14 to the liquid crystal panel 5 to obtain a component polarized in a direction orthogonal to the incident direction of the display light, a functional sheet for compensating for phase differences in light waves so as to widen the viewing angle and to prevent coloration, and a functional sheet for diffusing the display light. Specifically, referring to FIG. 1, the optical sheet 9 is a diffusing sheet, the optical sheet 8 is a prism sheet, and the optical sheet 7 is a polarization-converting sheet. Shapes and sizes of illuminated surfaces of the optical sheets 7, 8, and 9 are the same. The structure of the optical-sheet group 10 is not limited to that including the above-mentioned optical sheets but may be one including a luminance-improving film for improving luminance, a pair of upper and lower diffusing sheets sandwiching a retardation film or a prism sheet, or the like.

In the backlight device 3 having the above-described structure, display light that is supplied by the LEDs mounted on the plurality of light source substrates 14 enters the diffusing member 11 from the back surface thereof. The diffusing member 11 diffuses the display light entering from one principal surface, i.e., the back surface, by internally refracting and reflecting the light. The light is guided out of the other principal surface into the optical-sheet group 10. When part of the display light emitted from the LEDs enters the diffusing member 11 at an incident angle greater than the critical angle, the light is reflected at the surface of the diffusing member 11. The light reflected from the surface of the diffusing member 11 and part of the display light emitted from the LEDs and reflected at the reflective sheet 12 are repeatedly reflected between the diffusing member 11 and the reflective sheet 12, whereby reflectance can be improved according to the principle of enhanced reflection.

The backlight device 3 is assembled with the liquid crystal panel 5, and then the front frame 4 is attached so as to cover the four edges of the assembled structure, whereby all the parts including the liquid crystal panel 5 are fixed to each other and the liquid crystal display apparatus 1 is obtained. Thus, the liquid crystal display apparatus 1 is constructed by tightly superposing the parts. The front frame 4, the middle chassis 6, the side frame 15, and the back chassis 16 are made of, for example, metal or resin.

Next, a method for securing the optical sheets 7 to 9 used in the backlight device 3 so as to prevent not only deformation and damage but also considerable dislocation of the optical sheets 7 to 9 when subjected to vibration will be described.

As shown in FIG. 2, pin openings 23 to 25 having the same diameter are provided at the same appropriate position near bottom edges of the optical sheets 7 to 9, respectively. Each of the pin openings 23 to 25 is provided at a position that divides the bottom-edge length of the corresponding optical sheet into halves, i.e., the center of each bottom edge. By providing the pin openings 23 to 25 in the respective centers of the bottom edges, behavior of the optical sheets 7 to 9 when subjected to vibration with a vibration-proof pin 20, to be described below, fitted through the pin openings 23 to 25 is maximally stabilized. The position and number of the pin openings are to be determined taking influence of thermal expansion into consideration. The influence of thermal expansion of the optical sheets 7 to 9 can be minimized by providing one pin opening for each of the optical sheets 7 to 9 at a position near the bottom edge thereof.

The diffusing member 11 is provided with a notch 26 in a position corresponding to the respective openings 23 to 25 of the optical sheets 7 to 9 so that the vibration-proof pin 20, which is removable, can penetrate therethrough. Since the diffusing member 11 is thicker than the optical sheets 7 to 9, the diffusing member 11 is less likely to be damaged and therefore no pin opening is necessary for damage prevention. If a pin opening is provided in the diffusing member 11, the vibration-proof pin 20 may be broken because of the load applied by the diffusing member 11.

The vibration-proof pin 20 (a vibration-proof member) having substantially the same diameter as those of the pin openings 23 to 25 is fitted through the pin openings 23 to 25 and the notch 26. As to be described below, the vibration-proof pin 20 fitted through the pin openings 23 to 25 and the notch 26 is also fitted into a pin-fixing opening 22 provided in the middle chassis 6 so as to be held in a fixed state. In this manner, the optical sheets 7 to 9 and the diffusing member 11 are supported in a semifixed state between the middle chassis 6 and the reflective sheet 12. The vibration-proof pin 20 is made of, for example, resin or metal.

FIG. 3 is a front view of the middle chassis 6 that supports the optical sheets 7 to 9. As shown in FIG. 3, the optical-sheet group 10 (the optical sheets 7 to 9) and the diffusing member 11 are sized such that the four edges thereof are placed behind the frame of the middle chassis 6. The position and diameter of the pin openings 23 to 25 in the optical sheets 7 to 9 are determined so that a distance from bottom edges 10a of the optical sheets 7 to 9 to the pin openings 23 to 25 ensures a predetermined strength. If the distance is too short, the optical sheets 7 to 9 may be damaged when subjected to vibration. Further, the position of the pin openings 23 to 25 is determined so that the pin openings 23 to 25 are outside the edge of the screen, that is, behind the frame (bottom edge portion 21) of the middle chassis 6.

FIG. 4 shows a relevant part as an enlarged cross-sectional perspective view taken along line A-A in FIG. 3. The side frame 15 has a latch 35 extending vertically on an inner peripheral wall 36 of the side frame 15, i.e., parallel to the optical sheets 7 to 9, so as to latch the bottom edge portion 12a of the reflective sheet 12 onto the side frame 15. The inner peripheral wall 36 and the latch 35 of the side frame 15 and an inner peripheral wall 37 of the bottom edge portion 21 of the middle chassis 6 define a three-sided groove-like space. The optical-sheet group 10 and the diffusing member 11 are fitted into the groove-like space such that bottom edges 10a of the optical-sheet group 10 and the diffusing member 11 are in contact with the inner peripheral wall 36 of the side frame 15.

Next, the vibration-proof pin 20 will be described. As shown in FIG. 5, the vibration-proof pin 20 includes a small-diameter portion 20a, a large-diameter portion 20b, and a catch 20c produced by the difference between the diameters of the small- and large-diameter portions 20a and 20b. The length of the large-diameter portion 20b, i.e., the distance from the catch 20c to the tip of the large-diameter portion 20b is determined in accordance with the sum of thicknesses of the optical-sheet group 10 and the diffusing member 11 so that the optical-sheet group 10 and the diffusing member 11 are pinched by the inner peripheral wall 37 of the middle chassis 6 and the latch 35 of the side frame 15 with an appropriate pressure.

The small-diameter portion 20a of the vibration-proof pin 20 is inserted through the pin openings 23 to 25 and the notch 26 into the optical-sheet group 10 and the diffusing member 11 from the back thereof, and is further inserted into the pin-fixing opening 22 provided in the bottom edge portion 21 of the middle chassis 6 up to a position where the catch 20c stops the insertion. In this state, the bottom edges 10a of the optical-sheet group 10 and the diffusing member 11 are brought into contact with the inner peripheral wall 36 of the side frame 15. Next, the middle chassis 6 and the side frame 15 are engaged to be assembled together, with the bottom edge portion 12a of the reflective sheet 12 being latched by the latch 35 of the side frame 15 thereto.

The middle chassis 6 and the side frame 15 have screw holes (internal threads) 32 and 33, respectively. The screw holes 32 and 33 together provide a combined screw hole 34. By screwing a screw, not shown, into the screw hole 34, the middle chassis 6 and the side frame 15 are assembled and fixed together. Since the length of the large-diameter portion 20b of the vibration-proof pin 20 is set to an appropriate value, the optical-sheet group 10 and the diffusing member 11 are shiftably supported between the inner peripheral wall 37 of the middle chassis 6 and the bottom edge portion 12a of the reflective sheet 12. In this case, the optical-sheet group 10 is shiftable, when subjected to vibration, within a range corresponding to the difference between the diameter of the pin openings 23 to 25 and the diameter of the large-diameter portion 20b.

According to the above-described structure, since the optical sheets 7 to 9 stand upright under normal usage with the edges thereof supported by the supporting means, no force is applied to the pin openings 23 to 25 provided respectively in the optical sheets 7 to 9. When the optical sheets 7 to 9 are subjected to vibration, the vibration-proof pin 20 fitted through the optical sheets 7 to 9 prevent the optical sheets 7 to 9 from being considerably dislocated.

Thus, in a normal state, no force is applied to the pin openings 23 to 25 provided in the optical sheets 7 to 9 and therefore the optical sheets 7 to 9 are neither deformed nor damaged. Further, when the optical sheets 7 to 9 are subjected to vibration, the vibration-proof pin 20 fitted through the pin openings 23 to 25 prevents the optical sheets 7 to 9 from being considerably dislocated. Therefore, no rubbing between the optical sheets 7 to 9 occurs and consequently no damage occurs.

Although the number of pin openings provided in each of the optical sheets 7 to 9 is one in the above embodiment, provision of two pin openings along the bottom edge may be considered from the viewpoint of strength.

Although the above description is an exemplary case of employing the removable vibration-proof pin 20 as a vibration-proof member, a projecting pin integrally formed with the supporting means such as the middle chassis 6 or the side frame 15 may also be employed.

Although the pin-fixing opening 22 into which the small-diameter portion 20a of the vibration-proof pin 20 is fitted is provided in the bottom edge portion 21 of the middle chassis 6 in the above embodiment, the pin-fixing opening 22 may be provided in the side frame 15. For example, the latch 35 of the side frame 15 may be thickened and a pin-fixing opening may be provided therein for receiving the vibration-proof pin 20, while an opening into which the pin 20 is fitted may be provided in the bottom edge portion 12a of the reflective sheet 12.

Although a plurality of optical sheets are provided in the above embodiment, the present invention can be applied, of course, to the case of employing a single optical sheet.

Figure 6:
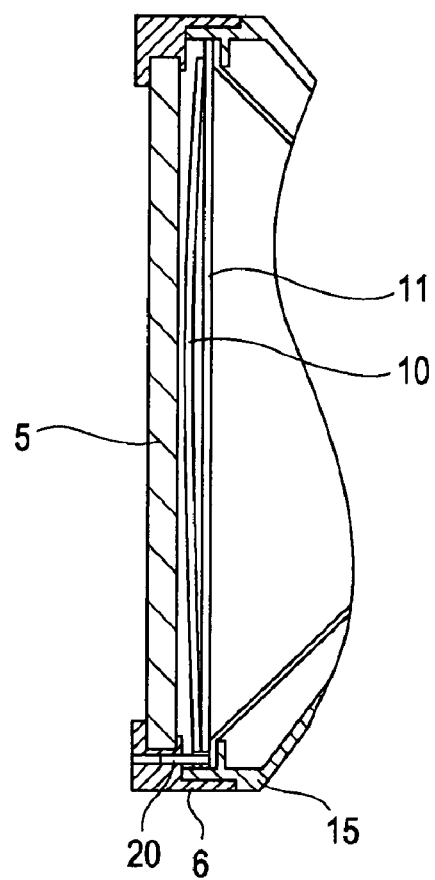
FIG. 6 illustrates deflection of optical sheets.

Referring to FIG. 6 showing a schematic cross-sectional view of the liquid crystal display apparatus 1 taken along line A-A, the optical-sheet group 10 is fixed by the vibration-proof pin 20 at the bottom edge thereof. Therefore, when a downward force caused by vibration is applied to the optical-sheet group 10, the optical-sheet group 10 may be deflected to buckle in a central region thereof. In order to prevent such a deflection, pieces of one-sided adhesive tape are provided on the top edge of the optical-sheet group 10 across from the vibration-proof pin 20 provided in the bottom edge so that the optical-sheet group 10 does not move. With the use of flexible adhesive tape, even if the optical-sheet group 10 expands with heat, the adhesive tape does not resist the expansion. As the adhesive tape, various types of tape including cellophane tape and the like can be employed.

Figure 7:
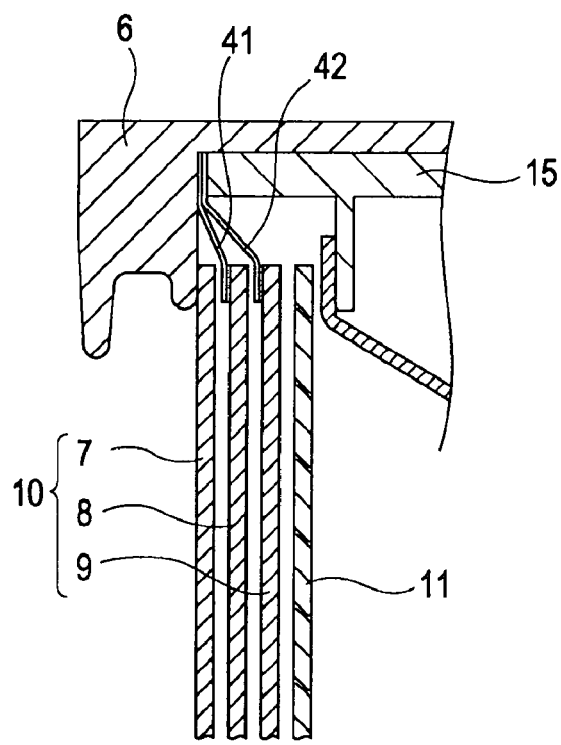
FIG. 7 illustrates adhesive tape pieces provided on upper sides of the optical sheets.
Figure 8:
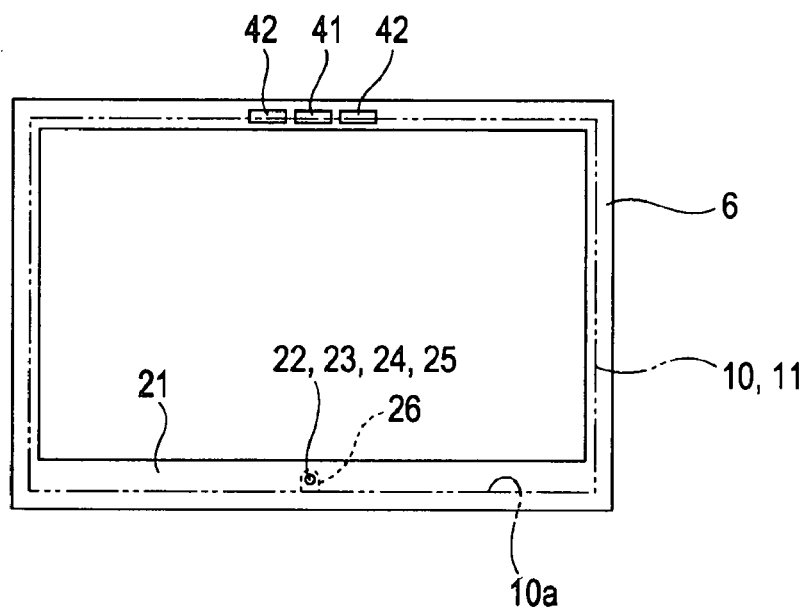
FIG. 8 is a front view of the middle chassis with the adhesive tape pieces provided thereon.
Figure 9:
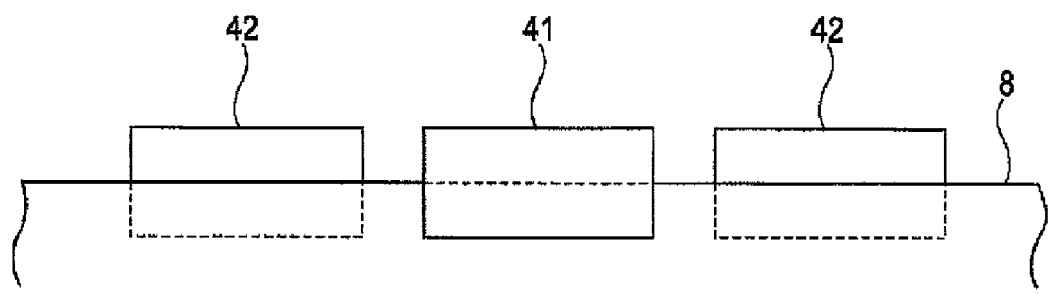
FIG. 9 illustrates positions where the adhesive tape pieces are to be provided.
Figure 10:
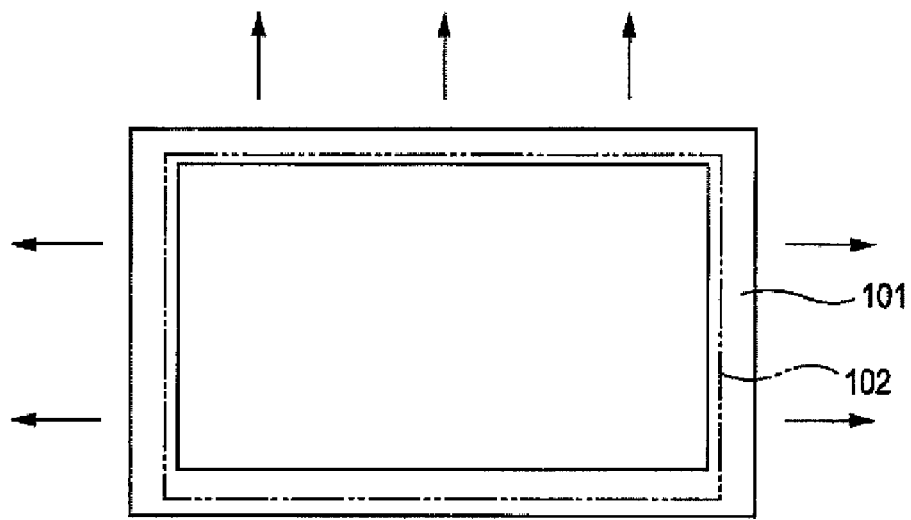
FIG. 10 illustrates an example of the related art.

Referring to FIGS. 7 to 9, a method for fixing the optical sheets in place with adhesive tape will be described. FIG. 7 illustrates a relevant part of the upper sides of the optical sheets 7 to 9. FIG. 8 is a front view of the middle chassis 6 with adhesive tape pieces provided thereon. FIG. 9 illustrates positions where the adhesive tape pieces are to be provided.

In FIG. 7, the optical-sheet group 10 includes the optical sheets 7, 8, and 9 arranged in that order from the side of the liquid crystal panel 5. Adhesive tape pieces 41 and 42 are adhered to the top edges of the optical sheets 8 and 9, respectively, at one end thereof at symmetrical positions to, that is, across from the vibration-proof pin 20 provided on the bottom edge with respect to the center of the optical sheets 8 and 9. The other end of each of the adhesive tape pieces 41 and 42 is pasted on the side frame 15 at a predetermined position and sandwiched between the middle chassis 6 and the side frame 15 that are to be fixed together using the screw (not shown). The optical sheet 7 facing the liquid crystal panel 5 is not provided with an adhesive tape piece because there is no possibility of it rubbing against the other optical sheets 8 and 9 even if deflected. However, an adhesive tape piece may also be provided on the optical sheet 7 so as to prevent deflection.

The adhesive tape piece 41 provided on the optical sheet 8 and the adhesive tape pieces 42 provided on the optical sheet 9 are positioned on the top edges and near the respective centers of the optical sheets 8 and 9, symmetrically to the vibration-proof pin 20. In this case, since the ends of the adhesive tape pieces 41 and 42 are to be sandwiched between the middle chassis 6 and the side frame 15, the adhesive tape pieces 41 and 42 are positioned so as not to overlap each other when viewed from the front. In other words, referring to FIG. 9, the adhesive tape piece 41 is provided in substantially the center of the top edge on the surface of the optical sheet 8, and the adhesive tape pieces 42 are provided on the surface of the optical sheet 9 such that the adhesive tape pieces 42 are positioned to the left and right, respectively, of the adhesive tape piece 41 when viewed from the front. Thus, the overall thickness of the adhesive tape pieces 41 and 42 provided between the middle chassis 6 and the side frame 15 is reduced and consequently the liquid crystal display apparatus can be made thinner.

Desirably, the adhesive tape pieces have a size so as not to appear within the screen when provided on the top edges of the optical sheets, and have adhesiveness and strength tolerable to deflection of the optical sheets. In addition, the adhesive tape pieces are desirably as thin as possible. Although the adhesive tape pieces 41 and 42 in the above example have dimensions of, for example, 50 mm (horizontal)×12 mm (vertical) with a thickness of about 50 μm, the dimensions are not limited thereto.

In the above embodiment, the adhesive tape pieces 41 and 42 are used for preventing deflection of the optical sheets 8 and 9 in the case where the vibration-proof pin 20 is used. The adhesive tape may be any type other than cellophane tape that is flexible and thin, but may also be string-like members as long as they have adhesiveness and flexibility and are thin. Further, the material, shape, and the like thereof are not limited.

The present invention is directed to preventing thin sheets, such as optical sheets, from being deformed, damaged, and, in case of being subjected to vibration, rubbed against each other. Therefore, the invention can be applied not only to the liquid crystal display apparatus described in the above embodiment but also to other display apparatuses using thin optical sheets.

The present invention is not limited to the above embodiment. Further, it should be understood by those skilled in the art that various modifications, combinations, sub-combinations and alterations may occur, such as use of CCFLs instead of LEDs as the light source of the liquid crystal display apparatus, depending on design requirements and other factors insofar as they are within the scope of the appended claims or the equivalents thereof.

The invention claimed is:

1. A backlight device comprising:
a light source;
supporting means having four edges arranged in a frame-like manner;
at least one optical sheet shiftably supported by the supporting means and allowing light emitted from the light source to pass therethrough and be incident on a back surface of a liquid crystal panel, the optical sheet having an opening in a position substantially dividing a length of a bottom edge thereof into halves, the bottom edge being in contact with the supporting means, and the opening having a first diameter; and
a vibration-proof member extending through the opening and fixed to the supporting means, the vibration-proof member including a pin having a second diameter, substantially smaller than the first diameter,
wherein:
the at least one optical sheet is shiftable within a range corresponding to the difference between the first diameter and the second diameter; and
when the at least one optical sheet is not subjected to vibrations and is positioned to stand upright, substantially no force is applied to the opening.

2. The backlight device according to claim 1, wherein a position and the first diameter of the opening provided in the optical sheet are determined so that a distance between the bottom edge of the optical sheet and the opening is set so as to provide a predetermined strength, and so that the opening is positioned behind the supporting means.

3. The backlight device according to claim 2, wherein the pin is a removable pin that is fitted through a pin-fixing opening provided in the supporting means and fixed thereto.

4. The backlight device according to claim 2, wherein the pin is formed integrally with the supporting means in a projecting manner.

5. The backlight device according to claim 1, further comprising a diffusing member disposed so as to be stacked on a back surface of the optical sheet with bottom edges of the diffusing member and the optical sheet being aligned with each other, the diffusing member having a notch in a position corresponding to the opening in the optical sheet.

6. A display apparatus comprising:
a display panel;
at least one optical sheet, the optical sheet having an opening in a position substantially dividing a length of a bottom edge thereof into halves, the opening having a first diameter;
frame-like supporting means for supporting four edges of the optical sheet; and
a vibration-proof member extending through the opening and fixed to the supporting means, the vibration-proof member including a pin having a second diameter, substantially smaller than the first diameter,
wherein the at least one optical sheet is shiftable within a range corresponding to the difference between the first diameter and the second diameter, and wherein the bottom edge of the optical sheet is in contact with the supporting means such that when the at least one optical sheet is not subjected to vibrations and is positioned to stand upright, substantially no force is applied to the opening.

7. The display apparatus according to claim 6, wherein a position and the first diameter of the opening provided in the optical sheet are determined so that a distance between the bottom edge of the optical sheet and the opening is set so as to provide a predetermined strength, and so that the opening is positioned behind the supporting means.

8. The display apparatus according to claim 7, wherein the pin is a removable pin that is fitted through a pin-fixing opening provided in the supporting means and fixed thereto.

9. The display apparatus according to claim 7, wherein the pin is formed integrally with the supporting means in a projecting manner.

10. The display apparatus according to claim 6, further comprising a diffusing member disposed so as to be stacked on a back surface of the optical sheet with bottom edges of the diffusing member and the optical sheet being aligned with each other, the diffusing member having a notch in a position corresponding to the opening in the optical sheet.

11. A backlight device comprising:
a light source;
a supporting member having four edges arranged in a frame-like manner;
at least one optical sheet shiftably supported by the supporting member and allowing light emitted from the light source to pass therethrough and be incident on a back surface of a liquid crystal panel, the optical sheet having an opening in a position substantially dividing a length of a bottom edge thereof into halves, the bottom edge being in contact with the supporting member, and the opening having a first diameter; and a vibration-proof member passing through the opening and fixed to the supporting member, the vibration-proof member including a pin having a second diameter, substantially smaller than the first diameter, wherein:

the at least one optical sheet is shiftable within a range corresponding to the difference between the first diameter and the second diameter; and when the at least one optical sheet is not subjected to vibrations and is positioned to stand upright, substantially no force is applied to the opening.

12. The backlight device according to claim 11, wherein a position and the first diameter of the opening provided in the optical sheet are determined so that a distance between the bottom edge of the optical sheet and the opening is set so as to provide a predetermined strength, and so that the opening is positioned behind the supporting member.

13. The backlight device according to claim 12, wherein the pin is a removable pin that is fitted through a pin-fixing opening provided in the supporting member and fixed thereto.

14. The backlight device according to claim 12, wherein the pin is formed integrally with the supporting member in a projecting manner.

15. The backlight device according to claim 11, further comprising a diffusing member disposed so as to be stacked on a back surface of the optical sheet with bottom edges of the diffusing member and the optical sheet being aligned with each other, the diffusing member having a notch in a position corresponding to the opening in the optical sheet.

16. A display apparatus comprising:

a display panel;

at least one optical sheet, the optical sheet having an opening in a position substantially dividing a length of a bottom edge thereof into halves, the opening having a first diameter;

a frame-like supporting member for supporting four edges of the optical sheet; and a vibration-proof member extending through the opening and fixed to the supporting member, the vibration-proof member including a pin having a second diameter, substantially smaller than the first diameter, wherein the at least one optical sheet is shiftable within a range corresponding to the difference between the first diameter and the second diameter, and wherein the bottom edge of the at least one optical sheet is in contact with the supporting member such that when the at least one optical sheet is not subjected to vibrations and is positioned to stand upright, substantially no force is applied to the opening.

17. The display apparatus according to claim 16, wherein a position and the first diameter of the opening provided in the optical sheet are determined so that a distance between the bottom edge of the optical sheet and the opening is set so as to provide a predetermined strength, and so that the opening is positioned behind the supporting member.

18. The display apparatus according to claim 17, wherein the pin is a removable pin that is fitted through a pin-fixing opening provided in the supporting member and fixed thereto.

19. The display apparatus according to claim 17, wherein the pin is formed integrally with the supporting member in a projecting manner.

20. The display apparatus according to claim 16, further comprising a diffusing member disposed so as to be stacked on a back surface of the optical sheet with bottom edges of the diffusing member and the optical sheet being aligned with each other, the diffusing member having a notch in a position corresponding to the opening in the optical sheet.

* * * * *